(12) United States Patent
Shapin et al.

(10) Patent No.: US 10,735,240 B2
(45) Date of Patent: Aug. 4, 2020

(54) PREEMPTION INDICATION FOR NEW RADIO

(71) Applicant: Telefonaktiebolaget LM Ericsson (publ), Stockholm (SE)

(72) Inventors: Alexey Shapin, Luleå (SE); Ali Behravan, Stockholm (SE); Gustav Wikstrom, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/260,373

(22) Filed: Jan. 29, 2019

(65) Prior Publication Data
US 2019/0165984 A1    May 30, 2019

Related U.S. Application Data

(63) Continuation of application No. 16/308,357, filed as application No. PCT/SE2018/050849 on Aug. 23, 2018.

(60) Provisional application No. 62/556,955, filed on Sep. 11, 2017.

(51) Int. Cl.
*H04L 12/28*    (2006.01)
*H04L 27/26*    (2006.01)
(Continued)

(52) U.S. Cl.
CPC ........ *H04L 27/2666* (2013.01); *H04L 5/0064* (2013.01); *H04W 72/044* (2013.01);
(Continued)

(58) Field of Classification Search
CPC ........... H04L 27/2666; H04L 72/2666; H04W 72/0446; H04W 76/27; H04W 73/0446
(Continued)

(56) References Cited

U.S. PATENT DOCUMENTS

2018/0278454 A1*   9/2018  Islam ................ H04L 1/0038
2018/0367263 A1*  12/2018  Ying ................. H04L 1/1887
(Continued)

OTHER PUBLICATIONS

3GPP TSG RAN WG,741 Meeting #90bis; Prague, Czech Rep.; Source; MCC Support; Title: Draft Report of 3GPP TSG RAN WG1 #90 v0,1.0 (Prague, Czech Rep, 21st-25th Aug. 2017) (R1-171xxxx)—Oct. 9-13, 2017.
(Continued)

*Primary Examiner* — John Pezzlo
(74) *Attorney, Agent, or Firm* — Baker Botts, LLP

(57) ABSTRACT

Preempting a slot with a mini-slot for use in a wireless transmitter of a wireless communication network is presented. The method includes preempting a slot transmission to a wireless receiver with a mini-slot transmission to the wireless receiver, wherein the slot transmission comprises a plurality of time-frequency regions (TFRs), each TFR comprising a plurality of sub-regions. The method further includes transmitting a preemption indication to the wireless receiver, where the preemption indication includes a TFR position in time of one or more preempted TFRs in the slot transmission, a TFR position in frequency of the one or more preempted TFRs in the slot transmission and an identifier of one or more of the plurality a sub-regions of the one more preempted TFRs.

8 Claims, 14 Drawing Sheets

(51) Int. Cl.
  *H04W 72/04* (2009.01)
  *H04W 76/27* (2018.01)
  *H04L 5/00* (2006.01)
  *H04J 1/16* (2006.01)
  *H04W 72/10* (2009.01)

(52) U.S. Cl.
  CPC ....... *H04W 72/0446* (2013.01); *H04W 76/27* (2018.02); *H04W 72/042* (2013.01); *H04W 72/10* (2013.01)

(58) Field of Classification Search
  USPC ........................................ 370/252, 329, 330
  See application file for complete search history.

(56) References Cited

U.S. PATENT DOCUMENTS

| | | | | |
|---|---|---|---|---|
| 2018/0368110 | A1* | 12/2018 | Ying | .................... H04W 72/04 |
| 2019/0044649 | A1* | 2/2019 | Kim | .......................... H04L 1/00 |
| 2019/0052432 | A1* | 2/2019 | Islam | .................... H04W 76/27 |
| 2019/0082450 | A1* | 3/2019 | Ying | ................. H04W 72/1268 |
| 2019/0327582 | A1* | 10/2019 | Lee | .......................... H04W 4/06 |

OTHER PUBLICATIONS

38PP Tsg Ran WG1 Meeting #90, Prague, Czech Rep; Source: MCC Support; Title: Final Report of 3GPP TSG RAN WG1 #89 v1.0.0 (Hangzhou, China, 15th-19th May 2017) (R1-1712031)—Aug. 21-25, 2017.
3GPP TSG RAN WG1 Meeting #90; Prague. Czech Rep; Source: MCC Support; Title: Final Report of 3GPP TSG RAN WG1 #AH_NR2 v1.0.0 (Qingdao, China, 28th-30th Jun. 2017) (R1-1712032)—Aug. 21-25, 2017.
3GPP TSG-RAN WG2 NR Ad Hoc; Spokane, USA; Source: Ericsson; Title: Overview of URLLC (Tdoc R2-1700393) Jan. 17-19, 2017.
3GPP TSG RAN WG1 Meeting #88, Athens, Greece; Source: LG Electronics; Title: Discussion on multiplexing of eMBB and URLLC for downlink (R1-1702488)—Feb. 13-17, 2017.
3GPP TSG RAN WG1 NR-Ad-Hoc#2; Qingdao, P.R. China; Source: Intel Corporation; Title: Remaining details of DL pre-emption indication (R1-1710575)—Jun. 27-30, 2017.
3GPP TSG RAN WG1 Meeting #; Prague, Czech Republic; Source: Sony; Title: On transmission of pre-emption indicator using Group Common DCI (R1-1712976)—Aug. 21-24, 2017.
3GPP TSG RAN WG1 Meeting #; Prague, P.R. Czechia; Source: Sequans Communications; Title: Consideration on pre-emption indicatin for DL (R1-1714085)—Aug. 21-25, 2017.
3GPP TSG RAN WG1 Ad Hoc Meeting; Nagoya, Japan; Source: Huawei, HiS#con; Title On pre-emption indication for DL multiplexing of URLLC and eMBB (R1-171540)—Sep. 18-21, 2017.
PCT International Search Report for International application No. PCT/SE2018/050849—dated Nov. 20, 2018.
PCT Written Opinion of the International Searching Authority for International application No. PCT/SE2018/050849—dated Nov. 20, 2018.

\* cited by examiner

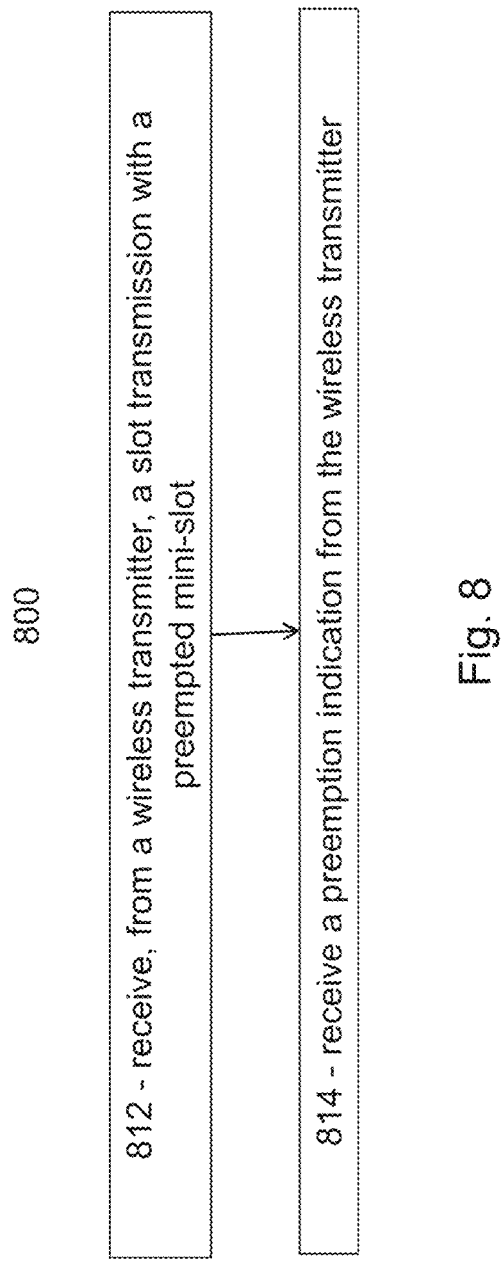

US 10,735,240 B2

PREEMPTION INDICATION FOR NEW RADIO

PRIORITY

This application is a continuation, under 35 U.S.C. § 120 of International Patent application Ser. No. 16/308,357 which is a U.S. National Stage Filing under 35 U.S.C. § 371 of International Patent Application Serial No. PCT/SE2018/050849 filed Aug. 23, 2018, and entitled "PREEMPTION INDICATION FOR NEW RADIO" which claims priority to U.S. Provisional Patent Application No. 62/556,955 filed Sep. 11, 2017, all of which are hereby incorporated by reference in their entirety.

TECHNICAL FIELD

Particular embodiments are directed to wireless communications and, more particularly, to a preemption indication scheme, parameters, and message structure for new radio (NR).

Third Generation Partnership Project (3GPP) defines a fifth generation (5G) of wireless communication that includes new radio (NR). Dynamic multiplexing of different services highly desirable for efficient use of system resources and to maximize system capacity. In downlink, the assignment of resources can be instantaneous and is only limited by the scheduler implementation. Once low-latency data appears in a buffer, a base station should choose the soonest moment of time when resources could be normally allocated. This may be either the beginning of a subframe or a mini-slot, where the mini-slot can start at any orthogonal frequency division multiplexing (OFDM) symbol.

The stringent latency budget of such traffic as ultra-reliable low latency communications (URLLC), however, may require transmission of a mini-slot signal without waiting for vacant resources. Thus a UE may need to handle puncturing/preemption of slot data transmission (i.e., cases when slot transmissions to UE1 on already allocated resources are overridden by a mini-slot transmission to UE2). This may negatively impact mini-slot transmitter interference on slot receivers. Dynamic resource sharing between slot and mini-slot transmissions in the uplink is also desirable and may involve puncturing/preemption of a slot by mini-slot transmissions.

As used herein, the terms "puncturing," "preemption," and "pre-emption" may be used interchangeably. 3GPP may prefer the term "preemption." Preemption may refer to a situation were UE may assume that no transmission to the UE is present in PRBs and in symbols.

FIG. 1 is a block diagram illustrating a general procedure of resource allocation. A buffer (block 1) collects packets of slot data and reports about data presence to Scheduler (block 7). Packets in the buffer (block 1) are waiting for a scheduling command which triggers channel coding, hybrid automatic repeat request (HARQ) cyclic buffer forming and modulation procedure (block 3). Scheduler (block 7) makes it decision about time-frequency ranges of modulated slot data and provides this information to block 5, which is responsible for forming a time-frequency grid that consists of modulation symbols. In practice, block 5 is able to aggregate inputs from more than one source and an upper limit is defined by various factors which are out of the scope of this disclosure.

In the process of forming the time-frequency grid, mini-slot data can arrive in the buffer (block 2). Because of strict latency requirements for mini-slot data, the Scheduler (7) may decide to replace part of slot modulation symbols by mini-slot modulation symbols. To do this the Scheduler (7) triggers mini-slot channel coding etc. by sending a command to block 4. It also sends updated grid mapping information to block 5. Simultaneously with that, the Scheduler (7) forms a special message with pre-emption information.

The prepared time-frequency grid is transferred to block 6 for OFDM modulation and further signal processing and then a radio signal is transmitted by block 8 to the antenna.

The Scheduler (7) could be a logical part of a transmitting node (base station) or it could be located outside of transmitting node (user equipment). In the first case, signaling data between blocks is delivered internally inside a node. The second case uses external signaling links between scheduler and transmitting node.

HARQ retransmissions with incremental redundancy may use a few different redundancy versions (RV) for subsequent retransmissions.

A general downlink preemption indication (PI) architecture may be based on presenting the time-frequency grid structure prior to the received PI message as one time/frequency region (TFR) and signaling which part(s) of the TFR are affected by preemption. TFR size and its internal resolution are defined before sending the PI message.

This approach, however, includes at least two problems. Accuracy inn be low with realistic signaling message size (around 20 bits). To achieve acceptable accuracy, a PI message may be limited to reporting only about a short time backward (e.g., around 1 time slot), which is not flexible in terms of signaling latency.

SUMMARY

The embodiments described herein include a pre-emption indication (PI) which includes a good trade-off between pre-emption indication resolution and signaling message size. Particular embodiments include a parameter set for proper tuning of the PI scheme. Some embodiments include a pre-emption indication message format.

According to one embodiment of the disclosure, a method of preempting a slot with a mini-slot for use in a wireless transmitter of a wireless communication network is provided. The method includes pre-empting a slot transmission to a wireless receiver with a mini-slot transmission to the wireless receiver, wherein the slot transmission comprises a plurality of time-frequency regions (TFRs), each TFR comprising a plurality of sub-regions. The method further includes transmitting a preemption indication to the wireless receiver, where the preemption indication includes: a TFR position in time of one or more preempted TRFs in the slot transmission, a TFR position in frequency of the one or more preempted TFRs in the slot transmission and an identifier of one or more of the plurality of sub-regions of the one more preempted TFRs.

According to one embodiment, a wireless device is provided. The wireless device includes processing circuitry operable to perform pre-empting a slot transmission to a wireless receiver with a mini-slot transmission to the wireless receiver, wherein the slot transmission comprises a plurality of time-frequency regions (TFRs), each TFR comprising a plurality of sub-regions. The processing circuitry is further operable to perform transmitting a preemption indication to the wireless receiver, where the preemption indication includes: a TFR position in time of one or more preempted TFRs in the slot transmission, a TFR position in frequency of the one or more preempted TFRs in the slot transmission and an identifier of one or more of the plurality of sub-regions of the one more preempted TFRs.

According to one embodiment, a network node is provided. The network node includes processing circuitry operable to perform pre-empting a slot transmission to a wireless receiver with a mini-slot transmission to the wireless receiver, wherein the slot transmission comprises a plurality of time-frequency regions (TFRs), each TFR comprising a plurality of sub-regions. The processing circuitry is further operable to perform transmitting a preemption indication to the wireless receiver, where the preemption indication includes: a TFR position in time of one or more preempted TFRs in the slot transmission, a TFR position in frequency of the one or more preempted TFRs in the slot transmission and an identifier of one or more of the plurality of sub-regions of the one more preempted TFRs.

According to one embodiment of the disclosure, a method of identifying a preempted mini-slot within a slot for use in a wireless receiver of a wireless communication network is provided. The method includes receiving, from a wireless transmitter, a slot transmission with a preempted mini-slot, wherein the slot transmission comprises a plurality of time-frequency regions (TFRs), each TFR comprising a plurality of sub-regions. The method further includes receiving a preemption indication from the wireless transmitter, where the preemption indication includes a TFR position in time of one or more preempted TFRs in the slot transmission, TFR position in frequency of the one or more preempted TFRs in the slot transmission, and an identifier of one or more of the plurality of sub-regions of the one more preempted TFRs.

According to one embodiment, a wireless device is provided. The wireless device includes processing circuitry operable to perform receiving, from a wireless transmitter, a slot transmission with a preempted mini-slot, wherein the slot transmission comprises a plurality of time-frequency regions (TFRs), each TFR comprising a plurality of sub regions. The processing circuitry is further operable to perform receiving a preemption indication from the wireless transmitter, where the preemption indication includes a TFR position in time of one or more preempted TFRs in the slot transmission, a TFR position in frequency of the one or more preempted TFRs in the slot transmission, and an identifier of one or more of the plurality of sub-regions of the one more preempted TFRs.

According to one embodiment, a network node is provided. The network node includes processing circuitry operable to perform receiving, from a wireless transmitter, a slot transmission with a preempted mini-slot, wherein the slot transmission comprises a plurality of time-frequency regions (TRFs), each TRF comprising a plurality of sub-regions. The processing circuitry is further operable to perform receiving a preemption indication from the wireless transmitter, where the preemption indication includes a TFR position in time of one or more preempted TFRs as in the slot transmission, a TFR position in frequency of the one or more preempted TFRs in the slot transmission, and an identifier of one or more of the plurality of sub-regions of the one more preempted TFRs.

A generalized scheme of pre-emption indication includes a scheme by which a system can point to a "Time-frequency region" where pre-emption took place and simultaneously point to a sub-region inside TFR. A two-step pointer makes signaling more accurate and signaling message becomes shorter. Particular embodiments may include some, all, or none of the following advantages. For example, particular embodiments achieve a good trade-off between pre-emption indication accuracy and size of signaling message, making signaling more efficient energy-wise. Some embodiments support a wide range of signaling delay.

BRIEF DESCRIPTION OF THE DRAWINGS

For a more complete understanding of the embodiments and their features and advantages, reference is now made to the following description, taken in conjunction with the accompanying drawings, in which:

FIG. 8 is a flow diagram illustrating an example method in a wireless receiver, according to particular embodiments;

DETAILED DESCRIPTION

Figure 1:
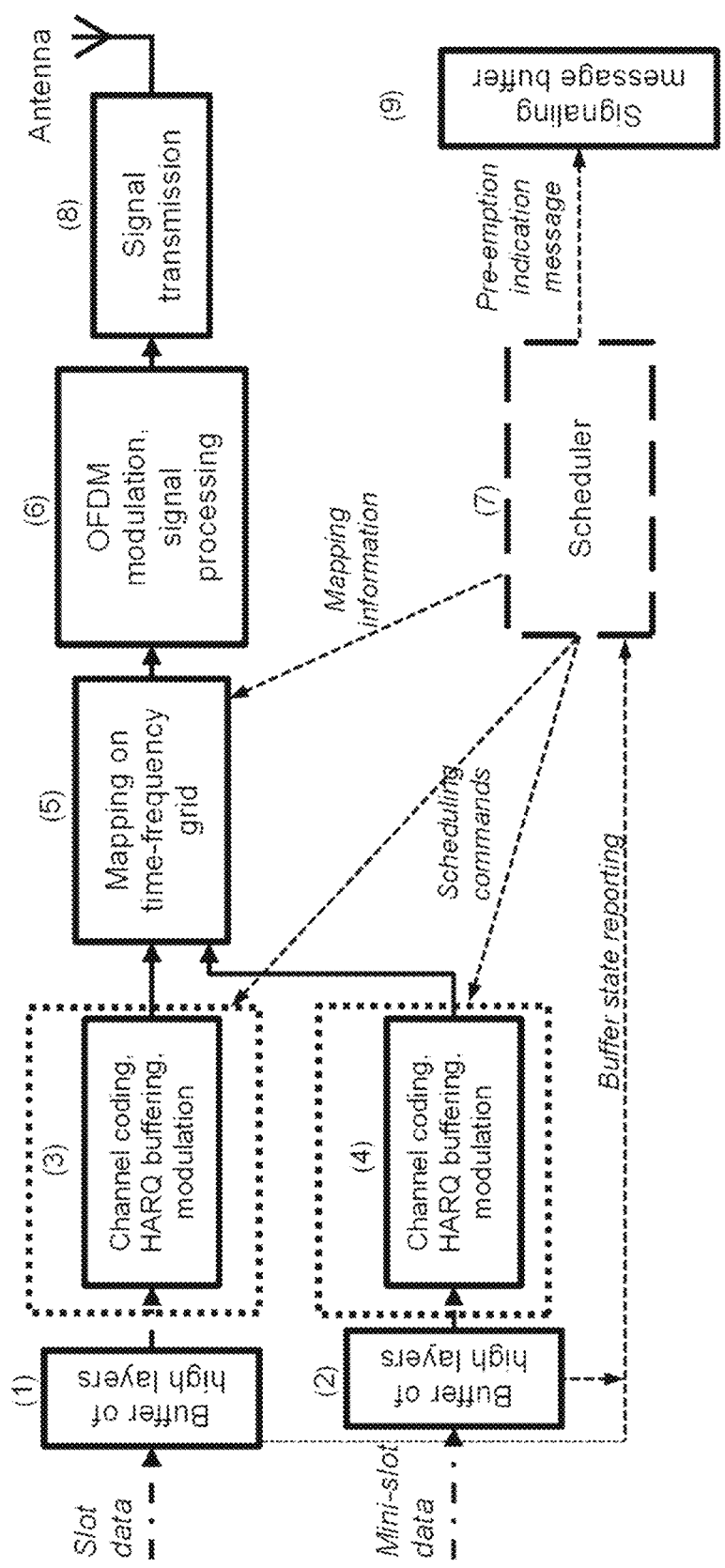
FIG. 1 is a block diagram illustrating a general procedure of resource allocation.

Third Generation Partnership Project (3GPP) defines a fifth generation (5G) of wireless communication that includes new radio (NR). Dynamic multiplexing of different services is highly desirable for efficient use of system resources and to maximize system capacity. When low-latency data appears in a buffer, a base station should choose the soonest moment of time when resources could be normally allocated. This may be either the beginning of a sub frame or a mini-slot, where the mini-slot can start at any orthogonal frequency division multiplexing (OFDM) symbol. The stringent latency budget of such traffic as ultra-reliable low latency communications (URLLC) may require transmission of a mini-slot signal without waiting for vacant resources. Thus a UE may need to preempt a slot data transmission (i.e., slot transmissions to UE1 bon already allocated resources are overridden by a mini-slot transmission to UE2). Dynamic resource sharing between slot and mini-slot transmissions in the uplink is also desirable and may involve puncturing/preemption of a slot by mini-slot transmissions.

A general downlink preemption indication (PI) architecture may be based on presenting, the time-frequency grid structure prior to the received PI message as one time/ frequency region (TFR) and signal which part(s) of the TFR are affected by pre-emption. TFR size and its internal resolution are defined before sending the PI message.

This approach, however, includes at least two problems. Accuracy may be low with realistic signaling message size (around 20 bits). To achieve acceptable accuracy, a PI message may be limited to reporting only about a short time backward (e.g., around 1 time slot), which is not flexible in terms of signaling latency.

Particular embodiments described herein obviate the problems described above and include a pre-emption indication that includes a good trade-off between pre-emption indication resolution and signaling message size. Particular embodiments include a parameter set for proper tuning of the PI scheme. Some embodiments include a pre-emption indication message format. Particular embodiments achieve a good trade-off between pre-emption indication accuracy and size of signaling message, making signaling more efficient energy-wise. Some embodiments support a wide range of signaling delay.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 2-10B of the drawings, like numerals being used for like and corresponding parts of the various drawings. Long Term Evolution (LTE) and NR are used throughout this disclosure as an example cellular system, but the ideas presented herein may apply to other wireless communication systems as well.

NR terminology and LTE terminology coincide to a considerable extent; for instance, a resource element (RE) remains 1 subcarrier×1 OFDM symbol. Yet some terms known in LTE have been even a new meaning in NR. This disclosure, including the claims, applies prefixes "LTE" and "NR" when indefiniteness could otherwise arise.

Figure 2:
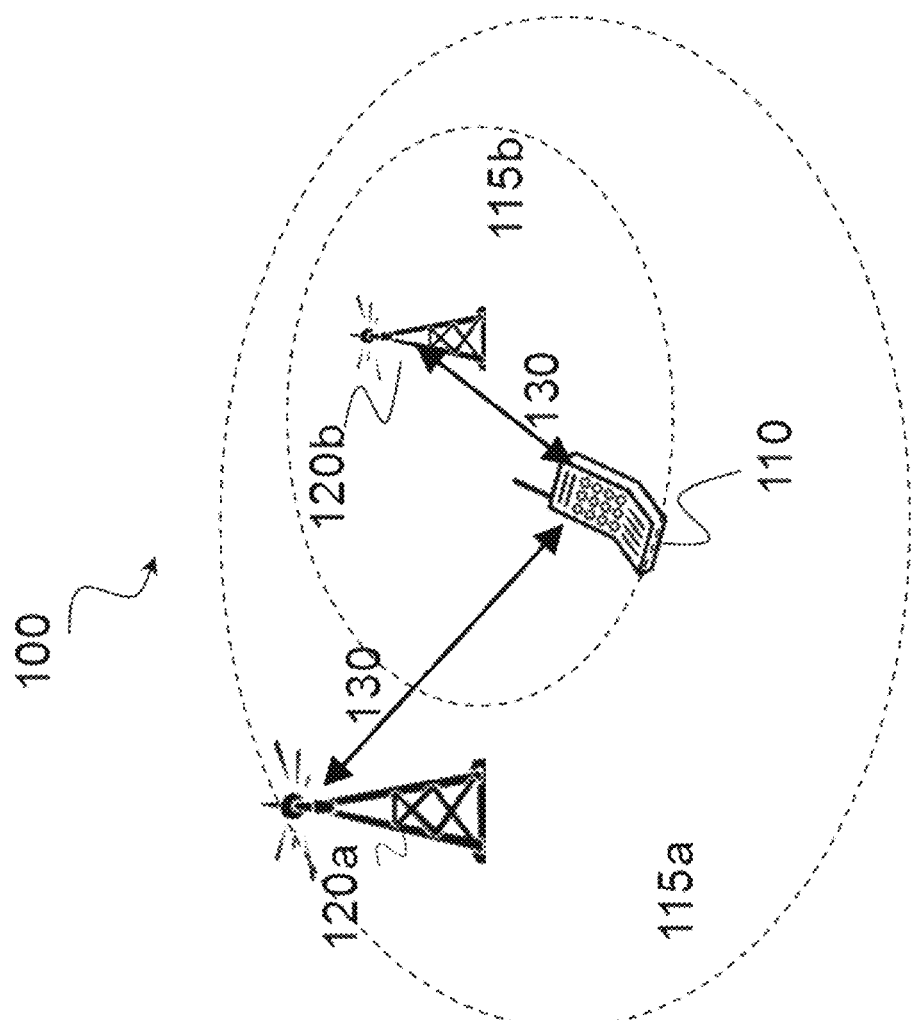
FIG. 2 is a block diagram illustrating an example wireless network, according to a particular embodiment.

FIG. 2 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Wireless device 110 may also be referred to as a User Equipment (UE). Network node 120 serves coverage area 115 (also referred to as cell 115).

In general, wireless devices 110 that are within coverage of network node 120 (e.g., within cell 115 served by network node 120) communicate with network node 120 by transmitting and receiving wireless signals 130. For example, wireless devices 110 and network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from network node 120 to wireless devices 110) and uplink transmissions (from wireless devices 110 to network node 120).

Each network node 120 may have a single transmitter or multiple transmitters for transmitting signals 130 to wireless devices 110. In some embodiments, network node 120 may comprise a multi-input multi-output (MIMO) system. Wireless signal 130 may comprise one or more beams. Particular beams may be beamformed in a particular direction. Each wireless device 110 may have a single receiver or multiple receivers for receiving signals 130 from network nodes 120 or other wireless devices 110. Wireless device 110 may receive one or more beams comprising wireless signal 130.

Wireless signals 130 may be transmitted on time-frequency resources. The time-frequency resources may be partitioned into radio frames, subframes, slots, and/or mini-slots. Network node 120 may dynamically schedule subframes/slots/mini-slots as uplink, downlink, or a combination uplink and downlink. Different wireless signals 130 may comprise different transmission processing times. Network node 120 may schedule a mini-slot to preempt an already scheduled slot. Network node 120 may transmit a preemption indication to wireless device 110 to inform wireless device 110 which time frequency resources were preempted. The preemption indication is described in more detail, below and with respect to FIGS. 3-8.

Network node 120 may operate in a licensed frequency spectrum, such as an LTE spectrum or NR spectrum. Network node 120 may also operate in an unlicensed frequency spectrum, such as a 5 GHz Wi-Fi spectrum. In an unlicensed frequency spectrum, network node 120 may coexist with other devices such as IEEE 802.11 access points and terminals. To share the unlicensed spectrum, network node 120 may perform LBT protocols before transmitting or receiving wireless signals 130. Wireless device 110 may also operate in one or both of licensed or unlicensed spectrum and in some embodiments may also perform LBT protocols before transmitting wireless signals 130. Both network node 120 and wireless device 110 may also operate in licensed shared spectrum.

For example, network node 120a may operate in a licensed spectrum and network node 120b may operate in an unlicensed spectrum. Wireless device 110 may operate in both licensed and unlicensed spectrum. In particular embodiments, network nodes 120a and 120b may be configurable to operate in a licensed spectrum, an unlicensed spectrum, a licensed shared spectrum, or any combination. Although the coverage area of cell 115b is illustrated as included in the coverage area of cell 115a, in particular embodiments the coverage areas of cells 115a and 115b may overlap partially, or may not overlap at all.

In particular embodiments, wireless device 110 and network nodes 120 may perform carrier aggregation. For example, network node 120a may serve wireless device 110 as a PCell and network node 120b may serve wireless device 110 as a SCell. Network nodes 120 may perform self-scheduling or cross-scheduling. If network node 120a is operating in licensed spectrum and network node 120b is operating in unlicensed spectrum, network node 120a may provide license assisted access to the unlicensed spectrum (i.e., network node 120a is a LAA PCell and network node 120b is a LAA SCell).

In wireless network 100, each network node 120 may use any suitable radio access technology, such as long term evolution (LTE), LTE-Advanced, UMTS, HSPA, GSM, cdma2000, NR, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communication with the wireless devices. The network may also include any additional elements suitable to support communication between wireless devices or between a wireless device and another communication device (such as a landline telephone). A wireless device may include any suitable combination of hardware and/or software. For example, in particular embodiments, wireless device, such as wireless device 110, may include the components described with respect to FIG. 9A below. Similarly, a network node may include any suitable combination of hardware and/or software. For example, in particular embodiments, a network node, such as network node 120, may include the components described with respect to FIG. 10A below.

Particular embodiments include a general preemption scheme based on a two-level pointer to pre-empted resources on a time-frequency grid. After preemption occurs, a base station sends a PI message to one User equipment (UE) or group of UEs via a signaling channel.

When a UE receives the message, the time-frequency resources before the message are logically divided onto TFRs according to a parameter set derived before.

The UE interprets fields of the PI message to identify which TFR was affected by pre-emption. The UE also interprets fields of the PI message to identify which part (sub-region) of the TFR was affected by preemption. An example is illustrated in FIG. 3.

Figure 3:
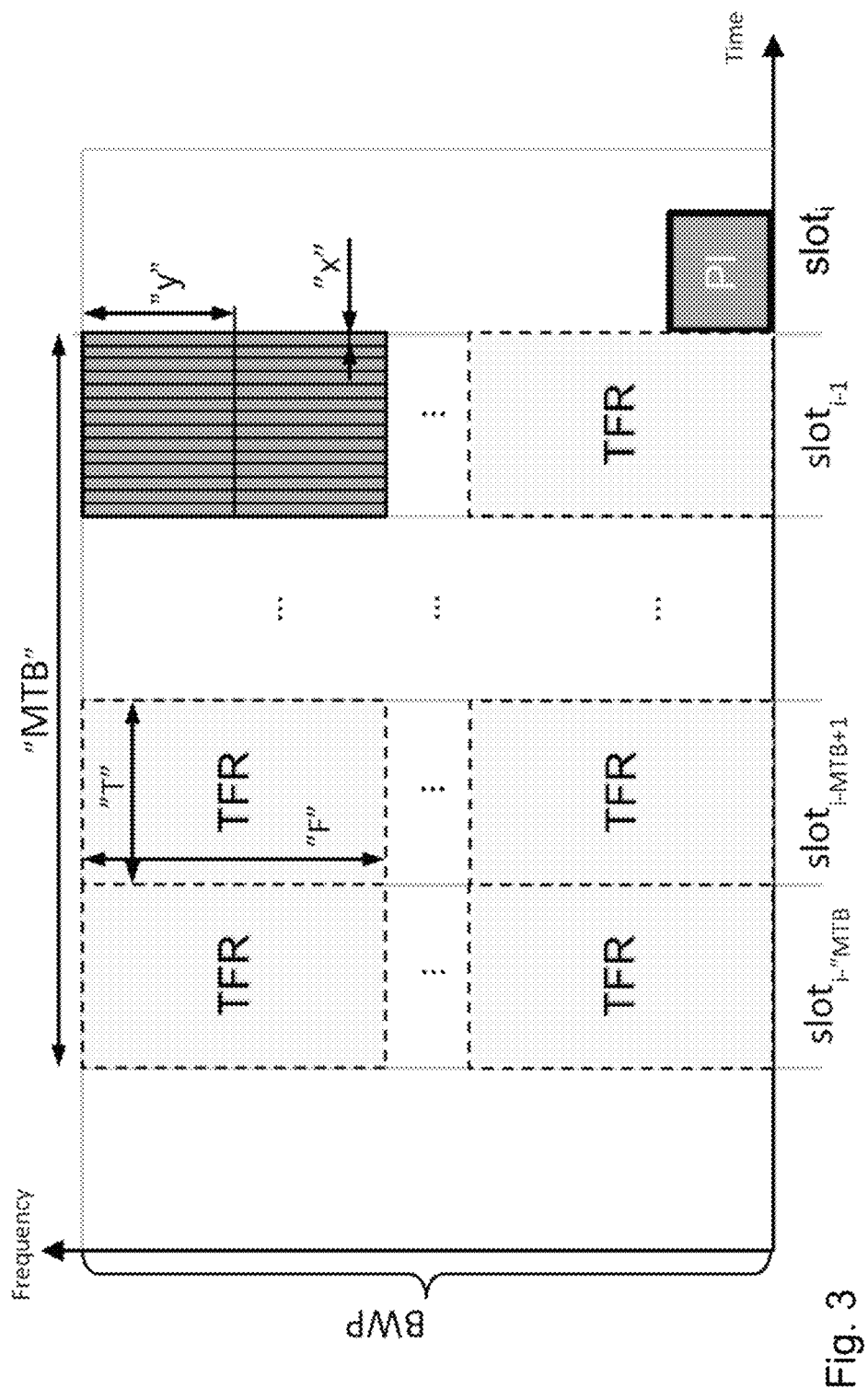
FIG. 3 is a time-frequency grid illustrating an example logical structure in a preemption indication algorithm, according to particular embodiments.

FIG. 3 is a time-frequency grid illustrating an example logical structure in a preemption indication algorithm, according to particular embodiments. The horizontal axis represents time and the vertical axis represents frequency. The logical structure may be parametrized according to the parameters below, the parameter set is used to configure LTEs for correct interpretation of PI message fields. Parameters of the PI algorithm include the following:

"T"—TFR size in time scale defined in OFDM symbols.
"F"—TFR size in frequency scale defined as BWP fraction.
"x"—TFR internal resolution in time scale defined in OFDM symbols.
"y"—TFR internal resolution in frequency scale defined in PRBs.
"MTB"—Max backward time covered by TFRs and defined in times of "T".

In particular embodiments, preemption configuration may be independent from slot size. "T" may be expressed in OFDM symbol units for TFR size in time scale configuration. In some embodiments, "T" may coincide with the size of the slot. Moreover, to keep PI message size small and achieve good flexibility in configuration, particular embodiments include a TFR size equal to or smaller than the BWP size.

The logical structure illustrated in FIG. 2 is flexible and can be used regardless of how many PI messages may be sent in parallel; whether a PI message is periodic or non-periodic; and whether the grid logical structures of two PI messages have intersections.

Particular embodiments include preemption indication parameters for configuration. A PI message can point to one of the TFR by a time field that tracks backwards in time from the reception of the PI message. The backward time may be limited by the parameter "Max T backward" (or MTB), which denotes the maximum backward time covered by TFRs. The parameter refers to a periodicity and/or time during which the UE may expect a PI message.

In principle, "x" can be from 1 up to a total number of os in the TFR, but to achieve a good resolution in the time domain a value of "x" can implicitly be set to 1 OFDM symbol. Following the same logic, a value "y" can be from 1 up to a total number PRBs in the TFR, but to simplify configuration procedure the value "y" can be implicitly set to total number of PRBs in TFR, which means there is no frequency resolution inside TFR. The indication may be wideband if "F"=1. Other parameters also have practical values, which are summarized in Table 1.

TABLE 1

Preemption indication parameters summary.

| Parameter name | Principal range | Practical values | Units |
|---|---|---|---|
| MTB | 1-any integer | 1, 2, 4, 8 | times of "T" |
| T | 1-any integer | 2-14 | Number of OFDM symbols |
| F | 1/N-1, where N is an integer | 1, ½, ¼ | Fraction of carrier bandwidth or bandwidth part |
| x | 1-T | 1, 2 | Number of OFDM symbols |
| y | 1-number of PRBs in one TFR | number of PRBs in one TFR | Number of PRBs |

Particular embodiments include a preemption indication message structure. The parameters have strict relation with the content of a PI message. Once preemption monitoring is configured for particular BWP, UEs may monitor for PI message of system pre-defined size. Interpretation of the PI message depends on signaled parameters and general interpretation is presented in FIG. 4.

Figure 4:
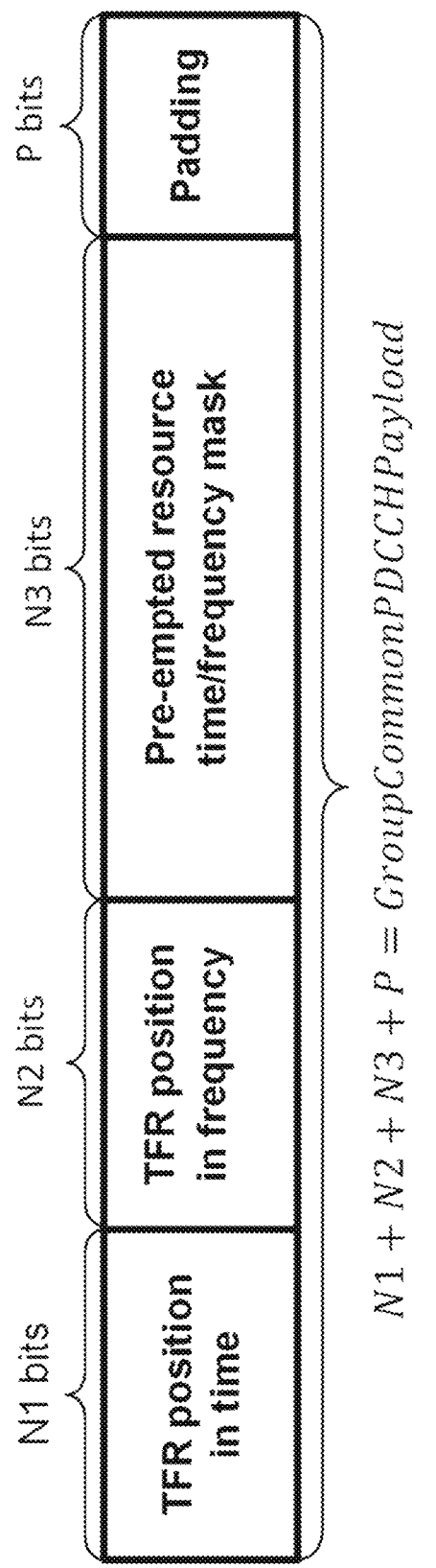
FIG. 4 is an example preemption indication message structure, according to a particular embodiment.

FIG. 4 is an example preemption indication message structure, according to a particular embodiment. The message structure includes a plurality of bits N1, N2, N3, and P. "TFR position in time" is a pointer at TFR backward in time from PI message reception time, expressed in T. "TFR position in frequency" is a pointer at TFR on frequency. The smaller the value, the closer the TFR is to the first-most subcarrier in the time-frequency grid. "Pre-empted resource time/frequency mask" explicitly defines which parts of TFR are affected by pre-emption, "0" means "not-affected" and "1" means "affected" or vice versa. For example, if internally TFR consist of 14 sub-regions, a 14-bit mask shows which of these sub-regions were affected.

In some embodiments, a relation between field sizes and parameters may be given by the following expressions:

$$N1 = \log_2(MTB) \text{ [bits]}$$

$$N2 = \log_2(1/F) \text{ [bits]}$$

$$N3 = \frac{T}{x} * \frac{BWP\_size\_in\_PRBs * F}{y} \text{ [bits]}$$

$$P = GroupCommonPDCCHPayload - N1 - N2 - N3$$

GroupCommonPDCCHPayload is defined by the system and this parameter definition is out of the scope of this disclosure. According to the above formulas, values of N1, N2 and P can have zero length and UE should interpret this accordingly. Because it is not allowed to exceed Group Common PDCCH payload, the definition of PI parameters is done in coordination with Group Common PDCCH pay load size.

Figure 5:
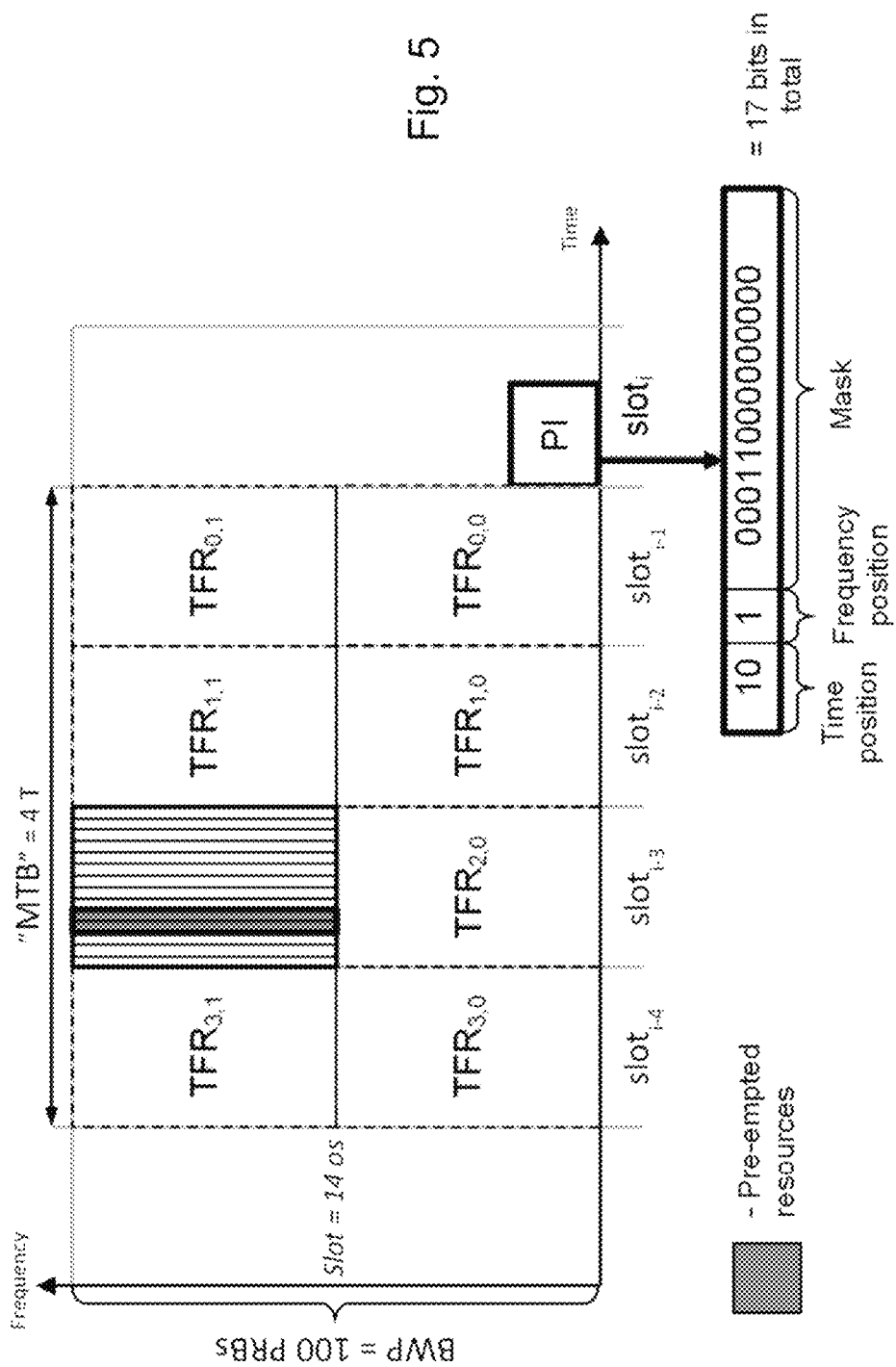
FIG. 5 is an example of a preemption indication according to a particular embodiment.

FIG. 5 is an example of a preemption indication, according to a particular embodiment. The horizontal axis represents time and the vertical axis represents frequency. The format of the PI may be the same as described with respect to FIG. 4.

The illustrated example includes a two OFDM-symbols pre-emption with resolution 1 os and half-spectrum. BWP=100 PRBs.

$MTB$ is $4\ T$. Time position field $N1 = \log_2(4) = 2$bits $F = \frac{1}{2}$ (half-of-bandwidth) $\Rightarrow$ frequency position field $N2 = \log_2(2) = 1$bit $T = 14\ OFDM$ symbols, $y = 50\ PRBs$ and $x = 1\ OFDM$ symbol.

Figure 6:
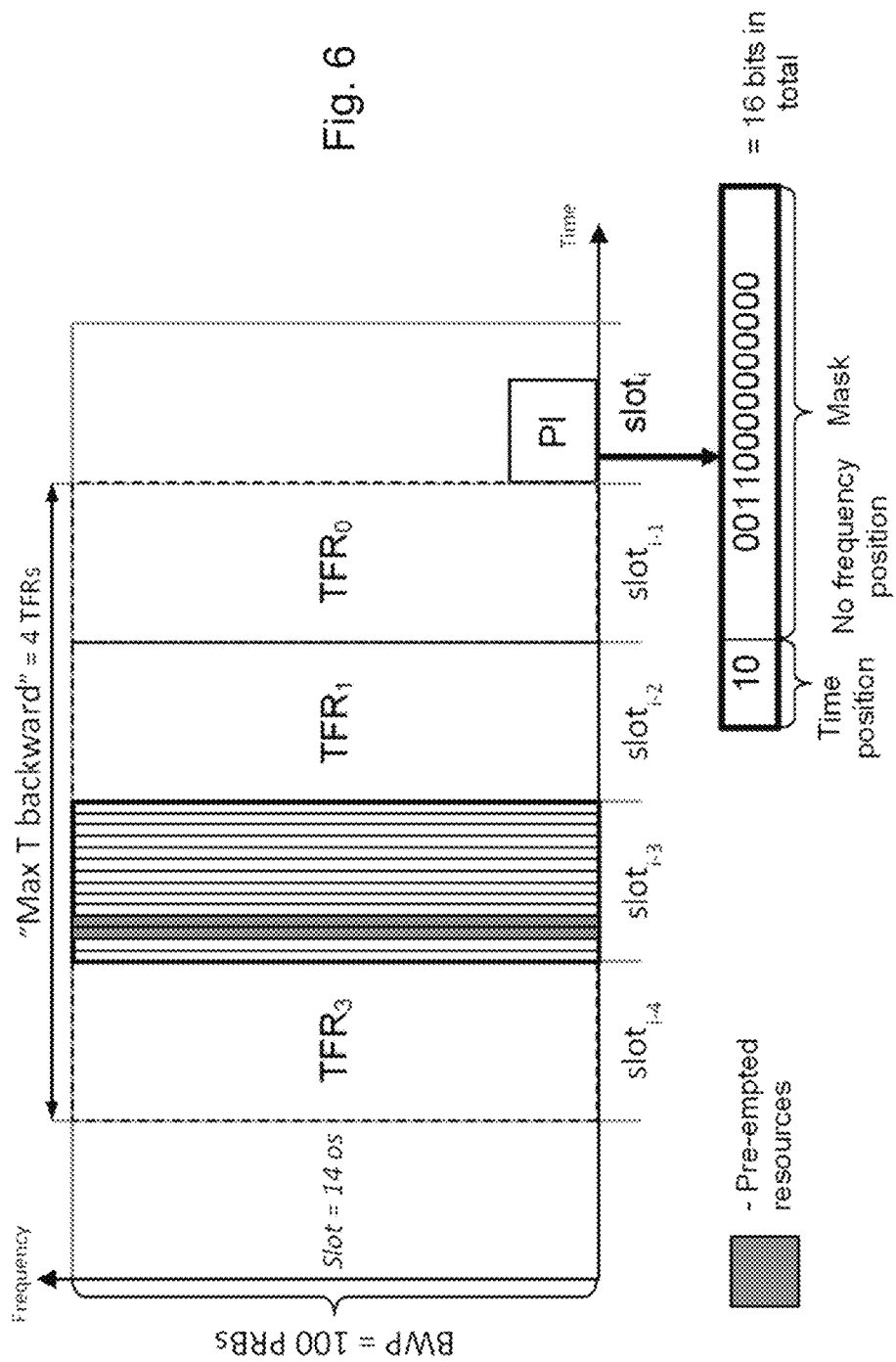
FIG. 6 is another example of a preemption indication, according to a particular embodiment.

Mask is $N3 = \left(\frac{14}{1} * \frac{100 * \frac{1}{2}}{50}\right) = 14$ bits FIG. 6 is another example of a preemption indication, according to a particular embodiment. The horizontal axis represents time and the vertical axis represents frequency. The format of the PI may be the same as described with respect to FIG. 4.

The illustrated example includes one preemption with resolution 1 os and full spectrum. BWP=100 PRBs.

max $T$ backward is $4\ TFRs$. Time position field $N1 = \log_2(4) = 2$bits $F = 1$(full-bandwidth) $\Rightarrow$ frequency position field $N2 = \log_2(1) = 0$bit $T = 14\ OFDM$ symbols, $y = 100\ PRBs$ and $x = 1\ OFDM$ symbols Mask is $N3 = \left(\frac{14}{1} * \frac{100 * 1}{100}\right) = 14$ bits Particular embodiments include UE configuration. Particular embodiments may include broadcasting a parameter set in a system information message, or RRC signaling. For both configuration options, particular embodiments include a full or shortened set of parameters. A shortened set of proposed parameters may include only three parameters (e.g., MBR, T and F), while x and y may be set implicitly by default configuration, such as identified in a 3GPP specification.

Figure 7:
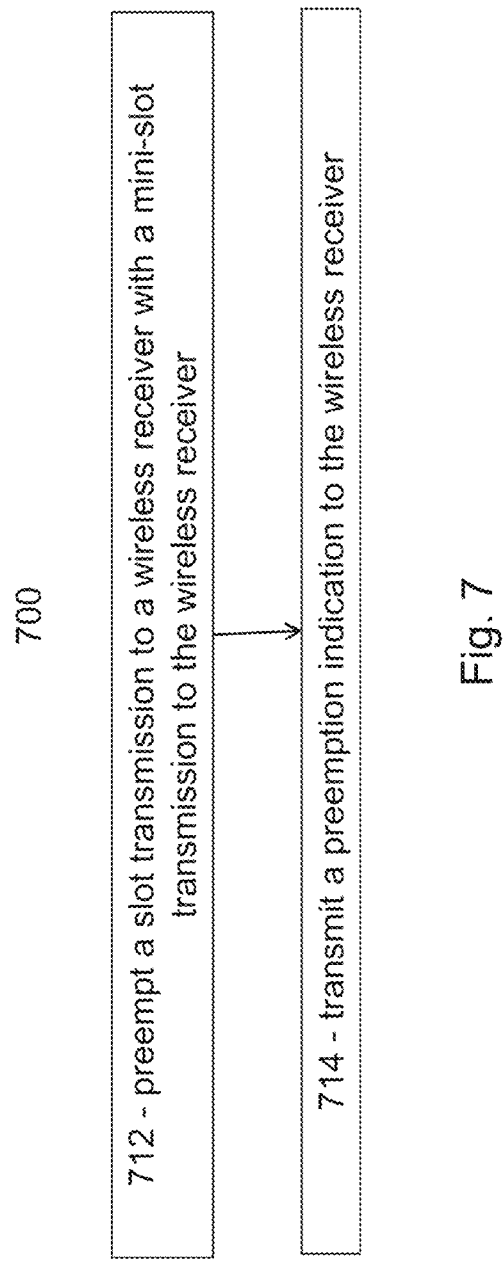
FIG. 7 is a flow diagram illustrating an example method in a wireless transmitter, according to particular embodiments.

FIG. 7 is a flow diagram illustrating an example method in a wireless transmitter, according to particular embodiments. In particular embodiments, one or more steps of FIG. 7 may be performed by network node 120 or wireless device 110 of network 100 described with respect to FIG. 2.

The method begins at step 712, where a wireless transmitter preempts a slot transmission to a wireless receiver with a mini-slot transmission to the wireless receiver. The slot transmission comprises a plurality of time-frequency regions (TFRs). Each TFR comprises a plurality of sub-regions. For example, network node 120 may receive low latency data for transmission and may place the data in mini-slot symbols for transmission. Network node 120 may replace previously scheduled slot symbols with the mini-slot symbols. The slot transmission may be divided into a plurality of TFRs, such as those illustrated with respect to FIGS. 3, 5, and 6, for example. The preempted symbols may be located within one or more of the TFRs (also referred to as a preempted TFR).

At step 714, the wireless transmitter transmits a preemption indication to the wireless receiver. The preemption indication identifies the preempted time-frequency resources. The preemption indication comprises a TFR position in time of one or more preempted TFRs the slot transmission; a TFR position in frequency of the one or more preempted TFRs in the slot transmission; and an identifier of one or more of the plurality of sub-regions of the one more preempted TFRs.

For example, network node 120 may transmit a preemption indication to the wireless device 110. The preemption indication may be formatted according to any of the preemption indication formats described above with respect to FIGS. 3-6.

Modifications, additions, or omissions may be made to method 700 of FIG. 7. Additionally, one or more steps in the method of FIG. 7 may be performed in parallel or in any suitable order. The steps may be repeated over time as necessary.

FIG. 8 is a flow diagram illustrating an example method in a wireless transmitter, according to particular embodiments. In particular embodiments, one or more steps of FIG. 8 may be performed by network node 120 or wireless device 110 of network 100 described with respect to FIG. 2.

The method begins at step 812, where a wireless receiver receives, from a wireless transmitter, a slot transmission with a preempted mini-slot. The slot transmission comprises a plurality of time-frequency regions (TFRs). Each TFR comprises a plurality of sub-regions. For example, wireless device 110 may receive a preempted slot from network node 120. The slot transmission may be divided into a plurality of TFRs, such as those illustrated with respect to FIGS. 3, 5, and 6, for example. The preempted symbols may be located within one or more of the TFRs (also referred to as a preempted TFR).

At step 814, the wireless receiver receives a preemption indication from the wireless transmitter. The preemption indication identifies the preempted time-frequency resources. The preemption indication comprises a TFR position in time of one or more preempted TFRs in the slot transmission; a TFR position in frequency of the one or more preempted TFRs in the slot transmission; and an identifier of one or more of the plurality of sub-regions of the one more preempted TFRs.

For example, network node 120 may transmit a preemption indication to the wireless device 110. The preemption indication may be formatted according to any of the preemption indication formats described above with respect to FIGS. 3-6.

Modifications, additions, or omissions may be made to method 800 of FIG. 8. Additionally, one or more steps in the method of FIG. 8 may be performed in parallel or in any suitable order. The steps may be repeated over time as necessary.

Figure 9B:
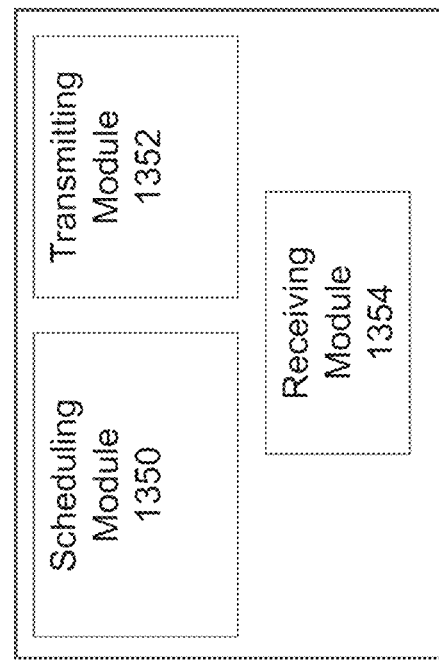
FIG. 9B is a block diagram illustrating example components of a wireless device.
Figure 9A:
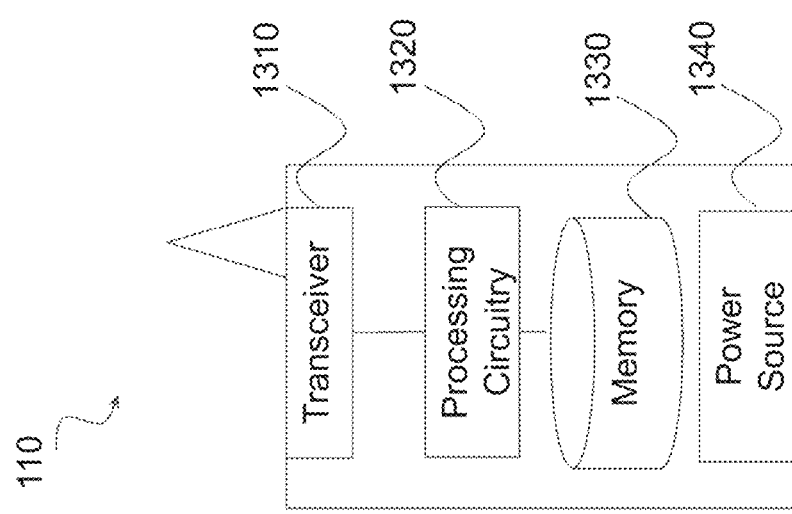
FIG. 9A is a block diagram illustrating an example embodiment of a wireless device.

FIG. 9A is a block diagram illustrating an example embodiment of a wireless device. The wireless device is an example of the wireless devices 110 illustrated in FIG. 2. In particular embodiments, the wireless device is capable of transmitting, receiving, and interpreting a preemption indication.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 1310, processing circuitry 1320, memory 1330, and power source 1340. In some embodiments, transceiver 1310 facilitates transmitting wireless signals to and receiving wireless signals from wireless network node 120 (e.g., via an antenna), processing circuitry 1320 executes instructions to provide some or all of the functionality described herein as provided by the wireless device, and memory 1330 stores the instructions executed by processing circuitry 1320. Power source 1340 supplies electrical power to one or more of the components of wireless device 110, such as transceiver 1310, processing circuitry 1320, and/or memory 1330.

Processing circuitry 1320 includes any suitable combination of hardware and software implemented in one or more integrated circuits or modules to execute instructions and manipulate data to perform some or all of the described functions of the wireless device. In some embodiments, processing circuitry 1320 may include, for example, one or more computers, one more programmable logic devices, one or more central processing units (CPUs), one or more microprocessors, one or more applications, and/or other logic, and/or any suitable combination of the preceding. Processing circuitry 1320 may include analog and/or digital circuitry configured to perform some or all of the described functions of wireless device 110. For example, processing circuitry 1320 may include resistors, capacitors, inductors, transistors, diodes, and/or any other suitable circuit components.

Memory 1330 is generally operable to store computer executable code and data, Examples of memory 1330 include computer memory (e.g., Random Access Memory (RAM) or Read Only Memory (ROM), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 1340 is generally operable to supply electrical power to the components of wireless device 110. Power source 1340 may include any suitable type of battery, such as lithium-ion, lithium-air, lithium polymer, nickel cadmium, nickel metal hydride, or any other suitable type of battery for supplying power to a wireless device.

Other embodiments of the wireless device may include additional components (beyond those shown in FIG. 9A) responsible for providing certain aspects of the wireless device's functionality, including any of the functionality described above and/or any additional functionality (including any functionality necessary to support the solution described above).

FIG. 9B is a block diagram illustrating example components of a wireless device 110. The components may include scheduling module 1350, transmitting module 1352 and receiving module 1354.

Scheduling module 1350 may perform the scheduling functions of wireless device 110. For example, scheduling module 1350 preempts a slot transmission to a network node with a mini-slot transmission according to any of the examples and embodiments described above. In certain embodiments, scheduling module 1350 may include or be included in processing circuitry 1320. In particular embodiments, scheduling module 1350 may communicate with transmitting module 1352 and receiving module 1354.

Transmitting module 1352 may perform the transmitting functions of wireless device 110. For example, transmitting module 1352 may transmit a preempted slot transmission and/or a preemption indication according to any of the examples and embodiments described above. In certain embodiments, transmitting module 1352 may include or be included in processing circuitry 1320. In particular embodiments, transmitting module 1352 may communicate with scheduling module 1350 and receiving module 1354.

Receiving module 1354 may perform the receiving functions of wireless device 110. For example, receiving module 1354 may receive a preempted slot transmission and/or a preemption indication according to any of the examples and embodiments described above In certain embodiments, receiving module 1354 may include or be included in processing circuitry 1320. In particular embodiments, transmitting module 1352 may communicate with scheduling module 1350 and transmitting module 1352.

Figure 10B:
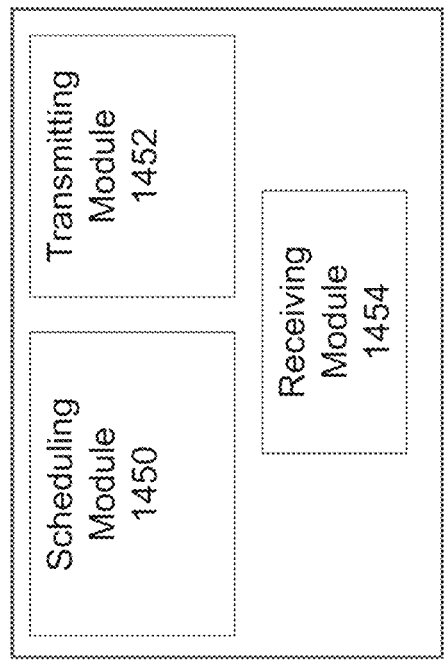
FIG. 10B is a block diagram illustrating example components of a network node.
Figure 10A:
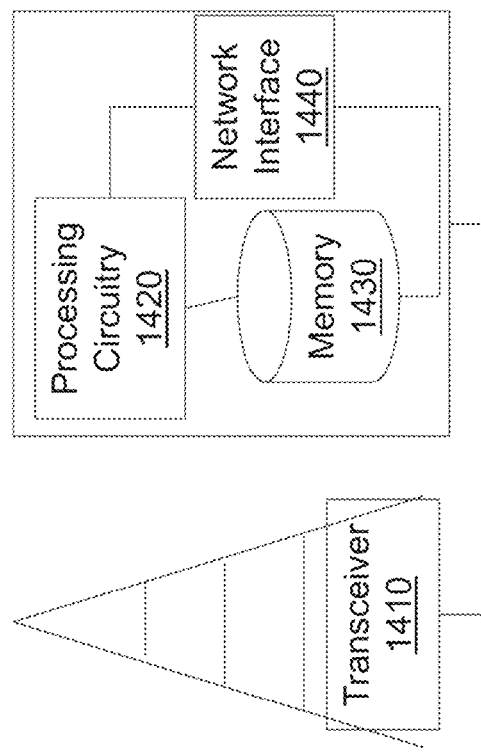
FIG. 10A is a block diagram illustrating an example embodiment of a network node.

FIG. 10A is a block diagram illustrating an example embodiment of a network node. The network node is an example of the network node 120 illustrated in FIG. 2. In particular embodiments, the network node is capable of transmitting, receiving, and interpreting a preemption indication.

Network node 120 can be an eNodeB, a node B, a base station, a wireless access point (e.g., a Wi-Fi access point), a low power node, a base transceiver station (BTS), transmission point or node, a remote RF unit (RRU), a remote radio head (RRH), or other radio access node. The network node includes at least one transceiver 1410, at least one processing circuitry 1420, at least one memory 1430, and at least one network interface 1440. Transceiver 1410 facilitates transmitting wireless signals to and receiving wireless signals from a wireless device, such as wireless devices 110 (e.g., via an antenna); processing circuitry 1420 executes instructions to provide some or all of the functionality described above as being provided by a network node 120; memory 1430 stores the instructions executed by processing circuitry 1420, and network interface 1440 communicates signals to backend network components, such as a gateway, switch, router, Internet, Public Switched Telephone Network (PSTN), controller, and/of other network nodes 120. Processing circuitry 1420 and 1430 can be of the same types as described with respect to processing circuitry 1320 and memory 1330 of FIG. 9A above.

In some embodiments, network interface 1440 is communicatively coupled, to processing circuitry 1420 and refers to any suitable device operable to receive input for network node 120, send output from network node 120, perform suitable processing of the input or output or both, communicate to other devices, or any combination of the preceding. Network interface 1440 includes appropriate hardware (e.g., port, modem, network interface card, etc.)

and software, including protocol conversion and data processing capabilities, to communicate through a network.

FIG. 10B is a block diagram illustrating example components of a network node 120. The components may include scheduling module 1450, transmitting module 1452 and receiving module 1454.

Scheduling module 1450 may perform the scheduling functions of network node 120. For example, scheduling module 1450 preempts a slot transmission to a wireless device with mini-slot transmission according to any of the examples and embodiments described above. In certain embodiments, scheduling module 1450 may include or be included in processing circuitry 1420. In particular embodiments, scheduling module 1450 may communicate with transmitting module 1452 and receiving module 1454.

Transmitting module 1452 may perform the transmitting functions of network node 120. For example, transmitting module 1452 may transmit a preempted slot transmission and/or a preemption indication according to any of the examples and embodiments described above. In certain embodiments, transmitting module 1452 may include or be included in processing circuitry 1420. In particular embodiments, transmitting module 1452 may communicate with scheduling module 1450 and receiving module 1454.

Receiving module 1454 may perform the receiving functions of network node 120. For example, receiving module 1454 may receive a preempted slot transmission and/or a preemption indication according to any of the examples and embodiments described above. In certain embodiments, receiving module 1454 may include or be included in processing circuitry 1420. In particular embodiments, transmitting module 1452 may communicate with scheduling module 1450 and transmitting module 1452.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP Third Generation Partnership Project
BBU Baseband Unit
BTS Base Transceiver Station
BWP Bandwidth Part
CB Code Block
CBG Code Block Group
CC Component Carrier
CRC Cyclic Redundancy Check
CQI Channel Quality Information
CSI Channel State Information
D2D Device to Device
DCI Downlink Control Information
DFI Discrete Fourier Transform
DMRS Demodulation Reference Signal
eNB eNodeB
FDD Frequency Division Duplex
FFT Fast Fourier Transform
gNB Next-generation NodeB
LAA Licensed-Assisted Access
LBT Listen-before-talk
LDPC Low-Density Parity Check
LTE Long Term Evolution
LTE-U LTE in Unlicensed Spectrum
M2M Machine to Machine
MCS Modulation and Coding Scheme
MIB Master Information Block
MIMO Multi-Input Multi-Output
MTB Maximum Time Backward
MTC Machine Type Communication
NR New Radio
OFDM Orthogonal Frequency Division Multiplexing
PCM Parity Check Matrix
PI Preemption Indication
PRB Physical Resource Block
RAN Radio Access Network
RAT Radio Access Technology
RBS Radio Base Station
RNC Radio Network Controller
RRC Radio Resource Control
RRH Remote Radio Head
RRU Remote Radio Unit
RV Redundancy Version
SCell Secondary Cell
SI System Information
SIB System Information Block
TB Transport Block
TBS Transport Block Size
TDD Time Division Duplex
TFR Time-Frequency Region
TTI Transmission Time Interval
UE User Equipment
UL Uplink
URLLC Ultra Reliable Low Latency Communication
UTRAN Universal Terrestrial Radio Access Network
WAN Wireless Access Network The following list provides non-limiting examples of how certain aspects of the proposed solutions could be implemented. The examples are merely intended to illustrate how certain aspects of the proposed solutions could be implemented, however, the proposed solutions could also be implemented in other suitable manners. Examples include:

Example Wireless Transmitter Embodiments

1. A method of preempting a slot with a mini-slot for use in a wireless transmitter of a wireless communication network, the method comprising:
preempting a slot transmission to a wireless receiver with a mini-slot transmission to the wireless receiver, wherein the slot transmission comprises a plurality of time-frequency regions (TFRs), each TFR comprising a plurality of sub-regions;
transmitting a preemption indication to the wireless receiver, the preemption indication comprising:
TFR position in time of one or more preempted TFRs in the slot transmission;

TFR position in frequency of the one or more preempted TFRs in the slot transmission; and an identifier of one or more of the plurality of sub-regions of the one more preempted TFRs.

2. The method of embodiment 1, wherein the TRF position in time of the one or more preempted TFRs in the slot transmission comprises an identifier of a TFR backward in time relative to the preemption indication.

3. The method of embodiment 2, wherein the TFR position in time of the one or more preempted TFRs in the slot transmission comprises an index of a TFR backward in time relative to the preemption indication within a maximum backward time.

4. The method of any of embodiments 1-3, wherein the TFR position in frequency of the one or more preempted TFRs in the slot transmission comprises a fraction of the total bandwidth.

5. The method of any of embodiments 1-4, wherein the identifier of one or more of the plurality of sub-regions of the one more preempted TFRs comprises a bitmap with a bit position for each sub-region.

6. A wireless device comprising processing circuitry operable to perform the method of any of embodiments 1-5.

7. A network node comprising processing circuitry operable to perform the method of any of embodiments 1-5.

8. A computer program comprising computer-readable instructions for causing at least one programmable processor to perform the method of any of embodiments 1-5.

Example Wireless Receiver Embodiments

1. A method of identifying a preempted mini-slot within a slot for use in wireless receiver of a wireless communication network, the method comprising:

receiving, from a wireless transmitter, a slot transmission with a preempted mini-slot, wherein the slot transmission comprises a plurality of time-frequency regions (TFRs), each TFR comprising a plurality of sub-regions;

receiving a preemption indication from the wireless transmitter, the preemption indication comprising:

a TFR position in time of one or more preempted TRFs in the slot transmission;

a TFR position in frequency of the one or more preempted TFRs in the slot transmission; and an identifier of one or more of the plurality of sub-regions of the one more preempted TFRs.

2. The method of embodiment 1, wherein the TFR position in time of the one or more preempted TFRs in the slot transmission comprises an identifier of a TFR backward in time relative to the preemption indication.

3. The method of embodiment 2, wherein the TFR position in time of the one or more preempted TFRs in the slot transmission comprises an index of a TFR backward in time relative to the preemption indication within a maximum backward time.

4. The method of any of embodiments 1-3, wherein the TFR position in frequency of the one or more preempted TFRs in the slot transmission comprises a fraction of the total bandwidth.

5. The method of any of embodiments 1-4, wherein the identifier of one or more of the plurality of sub-regions of the one more preempted TFRs comprises a bitmap with a bit position for each sub-region.

6. A wireless device comprising processing circuitry operable to perform the method of any of embodiments 1-5.

7. A network node comprising processing circuitry operable to perform the method of any of embodiments 1-5.

8. A computer program comprising computer-readable instructions for causing at least one programmable processor to perform the method of any of embodiments 1-5.

APPENDIX

The Appendix provides a non limiting example of how certain aspects of the proposed solutions could be implemented within the framework of a specific communication standard. In particular, the Appendix provides a non-limiting example of how the proposed solutions could be implemented within the framework of a 3GPP TSG RAN standard. The changes described by the Appendix are merely intended to illustrate how certain aspects of the proposed solutions could be implemented in a particular standard. However, the proposed solutions could so be implemented in other suitable manners, both in the 3GPP Specification and in other specifications or standards.

On Multiplexing Data with Different Transmission Durations

INTRODUCTION

Downlink Pre-emption may include the following features:
For preemption indication;
    When configured, the indication tells the UE(s) in which DL physical resources has been preempted.
    The preemption indication is transmitted using PDCCH.
        The preemption indication is not included in the DCI that schedules the (re)transmission of the data transmission.
    It is transmitted using a group common DCI in PDCCH
        The group common DC may be transmitted separately from SFI
        Whether a UE needs to monitor preemption indication is configured by RRC signalling
        The granularity of preemption indication in time domain can be configured
    Preempted resource(s) within a certain time/frequency region (i.e., reference downlink resource) within the periodicity to monitor group common DCI for pre-emption indication, is indicated by the group common DCI carrying the preemption indication
        The frequency region of the reference downlink resource is configured semi-statically
            May use explicit signaling or implicitly derived by other RRC signalling
        The time region of the reference downlink resource is configured semi-statically
            May use explicitly signaling or implicitly derived by other RRC signalling
        The frequency granularity of pre-emption indication is configured to be y RBs within the reference downlink resource for the given numerology
            May use explicit signaling or implicitly derived by other RRC signalling
            The y RBs can correspond to the whole frequency region of the downlink reference resource.
        The time granularity of pre-emption indication is configured to be x symbols within the reference downlink resource for the given numerology
            May use explicit signaling or implicitly derived by other RRC signalling
        Time/frequency granularities of pre-emption indication should take into account the payload size of the group common DCI carrying the pre-emption indication

DISCUSSION

On DL Pre-Emption Indication

A group common DCI may provide indication of downlink pre-emption. Because the usage is different and the feature support in UEs will most likely also be different, it may be preferred to separate the DL pre-emption indicator into a separate DCI message compared to the SFI indicator pre-emption indication message.
Proposal 1: The DL Preemption Indicator is Provided in Separate DCI Message from the SFI
A general DL pre-emption indication architecture may be based on pointing of "time/frequency region" (TFR) on the time-frequency resource grid and signal which part(s) of this TFR was affected by pre-emption. The resources may be configured either explicitly in RRC configuration or implicitly derived from other RRC configurations. In one example PI message, a system can report about only one TFR, but size of TFR and internal resolution can be configurable.
Observation 1. In One Preemption Indication Message Only One Time/Frequency Region (TFR) can be Indicated.
For parametrization of the algorithm, let's denote:
- "T"—TFR size in time scale defined in slots or OFDM symbols.
- "F"—TFR size in frequency scale defined as BWP fraction.
- "x"—TFR internal resolution in time scale defined in OFDM symbols.
- "y"—TFR internal resolution in frequency scale defined in PRBs.
- "Max T backward"—Max backward time covered by TFRs and defined in times of "T".

To make a discussion clear the pre-emption indication idea demonstrated on the FIG. A1, where "T"=1 slot (7 os), "F"=½ BWP, "x"=1 os, "y"=25 PRBs and "Max T backward" is 4.
To support a good granularity in time domain, it is beneficial to support a time granularity of one "OFDM symbols".
Proposal 2. A Time Granularity of One OFDM Symbols should be Supported
Regarding the frequency granularity of the indications, we observed that although a granularity of down to fraction of bandwidth can be useful, it will not provide as much gain. The reason is that the granularity cannot be down to RBs as it imposes a large payload for the indication, and the design should consider the size of the DCI message. Another issue with too fine granularity is the number of tests that a UE should pass for all different cases of pre-emptions. Furthermore we observe that it is beneficial if the DCI message for preemption indication matches the size of other DCI messages for to help the blind decoding. Therefore it is proposed that the frequency granularity is decided when the size of DCI message is known.
Proposal 3: The Granularity in Frequency Domain should be Decided Considering the Final Size of the DCI Message for Pre-Emption Indication as well as the Number of Tests that Need to be Performed for a UE with Different Pre-Emption Configurations.
We also note that it is possible that the preemption indication is not sent in the slot immediately after the pre-empted slot. Therefore, the indication can point to one of the TFR by e.g. a time field that tracks backwards in time from the reception of PI message. We can assume that this backward time can be up to a "Max T".
Proposal 4. The Indication should Contain a Field to Point at the Slot where the Preemption Occurred.
Whether the above indications are configured explicitly or implicitly depends on the final agreed configuration. In principle, "x" can be from 1 up to total number of os in "time/frequency region", but to achieve a good resolution in time domain a value of "x" can implicitly be set to 1 OFDM symbol. Following the same logic, a value "y" can be from 1 up to total number of PRBs in TFR, but to simplify BBC signaling the value "y" can be implicitly set to total number of PRBs in TFR. Let's summarize our proposal on parameter values:
- "Max T backward" can be 1, 2, 4 or 8 times of "T".
- "T" can be from 2 to 14 OFDM symbols;
- "F" can be 1, ½ and ¼ which corresponds to full BWP, ½ BWP, ¼ BWP;
- "x" can be only 1 OFDM symbol implicitly;
- "y" should coincide with parameter "F" implicitly, it means there is no frequency resolution inside "time/frequency region". The indication is wideband if "F"=1.

RAN1 needs to define relation between proposed parameters and content of PI message. Once pre-emption monitoring is configured for particular BWP, UEs may monitor for PI message of system pre-defined size, interpretation of the PI message depends on RRC signaled parameters and, general interpretation is presented on FIG. A2.
Once we defined the range of each parameter, a relation between field sizes and parameters can be easily expressed by simple expressions, e.g.:

$$N1 = \log_2(\text{Max } T \text{ backward}) \text{ [bits]}$$

$$N2 = \log_2(1/F) \text{ [bits]}$$

$$N3 = \frac{T}{x} * \frac{\text{BWP\_size\_in\_PRBs} * F}{y} \text{ [bits]}$$

or if take into account proposal 3, this expression can be simplified to: N3=T [bits]

$$P = \text{GroupCommonPDCCHPayload} - N1 - N2 - N3$$

According to these formulas, values of N1, N2 and P can be a zero length and UE should interpret this accordingly. Of course, it is not allowed to exceed Group Common PDCCH payload, therefore definition of PI parameters must be done based on Group Common PDCCH payload size.

Example 1-1. Two OFDM-Symbols Pre-Emption. Resolution 1 os and Half-Spectrum. BWP=100 PRBs max T backward is 4 TFRs. Time position field $N1 = \log_2(4) = 2$ bits
F=½ (half-of-bandwidth)=>frequency position field $N2 = \log_2(2) = 1$ bit, so y=50 PRBs.
T=14 OFDM symbols and x=1 os. Mask is $$N3 = \left(\frac{14}{1} * \frac{100 \times \frac{1}{2}}{50}\right) = 14 \text{ bits}$$

Example 1-2. One Pre-Emption. Resolution 1 os and Full-Spectrum. BWP=100 PRBs max T backward is 4 TFRs. Time position $N1 = \log_2(4) = 2$ bits
F=1 (full-bandwidth)=>frequency position field $N2 = \log_2(1) = 0$ bit, so y=100 PRBs.
T=14 OFDM symbols and x=1 os. Mask is $$N3 = \left(\frac{14}{1} * \frac{100 \times 1}{100}\right) = 14 \text{ bits}$$

The invention claimed is:

1. A method of preempting a slot with a mini-slot for use in a wireless transmitter of a wireless communication network, the method comprising:
   preempting a slot transmission to a wireless receiver with a mini-slot transmission to the wireless receiver, wherein the slot transmission comprises a plurality of time-frequency regions (TFRs), each TFR comprising a plurality of sub-regions;
   transmitting a preemption indication to the wireless receiver, wherein the interpretation of the pre-emption indication depends on RRC signalled parameters, wherein the preemption indication indicates:
   a TFR position in time of one or more pre-empted TFRs in the slot transmission, wherein the TFR position in time identifies a TFR backward in time relative to the preemption indication; and
   an identifier of one or more of the plurality of sub-regions of the one more preempted TFRs, wherein the identifier of one or more of the plurality of sub-regions of the one or more pre-empted TFRs comprises a bitmap with a bit position for each sub-region.

2. The method of claim 1, wherein the TFR position in time of the one or more preempted TFRs in the slot transmission comprises an index of a TFR backward in time relative to the preemption indication within a maximum backward time.

3. The method of claim 1, wherein the TFR position in frequency of the one or more preempted TFRs in the slot transmission comprises a fraction of the total bandwidth.

4. A network node comprising processing circuitry operable to:
   preempt a slot transmission to a wireless receiver with a mini-slot transmission to the wireless receiver, wherein the slot transmission comprises a plurality of time-frequency regions (TFRs), each TFR comprising a plurality of sub-regions;
   transmit a preemption indication to the wireless receiver, wherein the interpretation of the pre-emption indication depends on RRC signalled parameters, wherein the preemption indication indicates:
   a TFR position in time of one or more pre-empted TFRs in the slot transmission, wherein the TFR position in time identifies a TFR backward in time relative to the preemption indication; and
   an identifier of one or more of the plurality of sub-regions of the one more preempted TFRs, wherein the identifier of one or more of the plurality of sub-regions of the one or more pre-empted TFRs comprises a bitmap with a bit position for each sub-region.

5. A method of identifying a preempted mini-slot within a slot for use in a wireless receiver of a wireless communication network, the method comprising:
   receiving, from a wireless transmitter, a slot transmission with a preempted mini-slot, wherein the slot transmission comprises a plurality of time-frequency regions (TFRs), each TFR comprising a plurality of sub-regions;
   receiving a preemption indication from the wireless transmitter, wherein the interpretation of the pre-emption indication depends on RRC signalled parameters, wherein the preemption indication indicates:
   a TFR position in time of one or more pre-empted TFRs in the slot transmission, wherein the TFR position in time identifies a TFR backward in time relative to the preemption indication; and
   an identifier of one or more of the plurality of sub-regions of the one more preempted TFRs, wherein the identifier of one or more of the plurality of sub-regions of the one or more pre-empted TFRs comprises a bitmap with a bit position for each sub-region.

6. The method of claim 5, wherein the TFR position in time of the one or more preempted TFRs in the slot transmission comprises an index of a TFR backward in time relative to the preemption indication within a maximum backward time.

7. The method of claim 5, wherein the TFR position in frequency of the one or more preempted TFRs in the slot transmission comprises a fraction of the total bandwidth.

8. A wireless device comprising processing circuitry operable to:
   receive, from a wireless transmitter, a slot transmission with a preempted mini-slot, wherein the slot transmission comprises a plurality of time-frequency regions (TFRs), each TFR comprising a plurality of sub-regions;
   receive a preemption indication from the wireless transmitter, wherein the interpretation of the pre-emption indication depends on RRC signalled parameters, wherein the preemption indication indicates:
   a TFR position in time of one or more pre-empted TFRs in the slot transmission, wherein the TFR position in time identifies a TFR backward in time relative to the preemption indication; and
   an identifier of one or more of the plurality of sub-regions of the one more preempted TFRs, wherein the identifier of one or more of the plurality of sub-regions of the one or more pre-empted TFRs comprises a bitmap with a bit position for each sub-region.

* * * * *

UNITED STATES PATENT AND TRADEMARK OFFICE
CERTIFICATE OF CORRECTION

PATENT NO. : 10,735,240 B2
APPLICATION NO. : 16/260373
DATED : August 4, 2020
INVENTOR(S) : Shapin et al.

Page 1 of 5

It is certified that error appears in the above-identified patent and that said Letters Patent is hereby corrected as shown below:

On the Title Page

In Item (57), under "ABSTRACT", in Column 2, Line 9, delete "includes a" and insert -- includes: a --, therefor.

In Item (57), under "ABSTRACT", in Column 2, Line 13, delete "plurality a" and insert -- plurality of a --, therefor.

In Item (57), under "ABSTRACT", in Column 2, Line 13, delete "one more" and insert -- one or more --, therefor.

On Page 2, in Item (56), under "OTHER PUBLICATIONS", in Column 2, Line 21, delete "indicatin" and insert -- indication --, therefor.

In the Specification

In Column 1, Line 25, delete "services highly" and insert -- services is highly --, therefor.

In Column 1, Line 49, delete "were" and insert -- where --, therefor.

In Column 1, Lines 57-58, delete "procedure (block 3). Scheduler (block 7) makes it decision" and insert -- procedures (block 3). Scheduler (block 7) makes a decision --, therefor.

In Column 2, Line 23, delete "signaling which" and insert -- signaling in which --, therefor.

In Column 2, Line 27, delete "inn be" and insert -- may be --, therefor.

In Column 2, Line 51, delete "TRFs" and insert -- TFRs --, therefor.

In Column 2, Line 54, delete "one more" and insert -- one or more --, therefor.

Signed and Sealed this
Nineteenth Day of January, 2021

Andrei Iancu
*Director of the United States Patent and Trademark Office*

CERTIFICATE OF CORRECTION (continued)
U.S. Pat. No. 10,735,240 B2

In Column 3, Line 2, delete "one more" and insert -- one or more --, therefor.

In Column 3, Line 16, delete "one more" and insert -- one or more --, therefor.

In Column 3, Line 27, delete "transmission, TFR" and insert -- transmission, a TFR --, therefor.

In Column 3, Line 30, delete "one more" and insert -- one or more --, therefor.

In Column 3, Lines 36-37, delete "sub regions." and insert -- sub-regions. --, therefor.

In Column 3, Line 43, delete "one more" and insert -- one or more --, therefor.

In Column 3, Line 50, delete "(TRFs), each TRF" and insert -- (TFRs), each TFR --, therefor.

In Column 3, Line 54, delete "TFRs as in the" and insert -- TFRs in the --, therefor.

In Column 3, Line 58, delete "one more" and insert -- one or more --, therefor.

In Column 4, Line 19, delete "indication according" and insert -- indication, according --, therefor.

In Column 4, Line 38, delete "illstrates a premption" and insert -- illustrates a preemption --, therefor.

In Column 4, Line 40, delete "illustrates preemption" and insert -- illustrates a preemption --, therefor.

In Column 4, Line 42, delete "illustrates preemption" and insert -- illustrates a preemption --, therefor.

In Column 4, Line 54, delete "sub frame" and insert -- subframe --, therefor.

In Column 4, Line 60, delete "bon" and insert -- on --, therefor.

In Column 4, Line 67, delete "presenting," and insert -- presenting --, therefor.

In Column 5, Line 52, delete "even" and insert -- given --, therefor.

In Column 5, Line 64, delete "115." and insert -- 115). --, therefor.

In Column 6, Line 35, delete "detail," and insert -- detail --, therefor.

In Column 7, Lines 19-20, delete "communication" and insert -- communicating --, therefor.

In Column 7, Line 26, delete "embodiments, wireless" and insert -- embodiments, a wireless --, therefor.

In Column 7, Lines 36-37, delete "User equipment" and insert -- user equipment --, therefor.

CERTIFICATE OF CORRECTION (continued)
U.S. Pat. No. 10,735,240 B2

In Column 7, Lines 41-45, delete "The UE . . . . FIG.3." and insert the same at Line 40, after "before." as a continuation paragraph.

In Column 7, Line 51, delete "below, the" and insert -- below. The --, therefor.

In Column 7, Line 52, delete "LTEs" and insert -- UEs --, therefor.

In Column 8, Line 23, delete "number PRBs" and insert -- number of PRBs --, therefor.

In Column 9, Line 16, delete "pay load" and insert -- payload --, therefor.

In Column 9, Line 62, delete "MBR," and insert -- MTB, --, therefor.

In Column 10, Line 21, delete "TFRs the" and insert -- TFRs in the --, therefor.

In Column 10, Line 24, delete "one more" and insert -- one or more --, therefor.

In Column 10, Line 59, delete "one more" and insert -- one or more --, therefor.

In Column 11, Line 36, delete "one more" and insert -- one or more --, therefor.

In Column 11, Line 47, delete "data," and insert -- data. --, therefor.

In Column 11, Line 49, delete "(ROM)," and insert -- (ROM)), --, therefor.

In Column 11, Line 51, delete "and/or or" and insert -- and/or --, therefor.

In Column 12, Line 28, delete "above In" and insert -- above. In --, therefor.

In Column 12, Line 32, delete "transmitting module 1352." and insert -- receiving module 1354. --, therefor.

In Column 12, Line 39, delete "node B," and insert -- nodeB, --, therefor.

In Column 12, Line 41, delete "(BTS)," and insert -- (BTS), a --, therefor.

In Column 12, Line 53, delete "1420, and" and insert -- 1420; and --, therefor.

In Column 12, Line 56, delete "and/of" and insert -- and/or --, therefor.

In Column 12, Line 57, delete "and 1430" and insert -- and memory 1430 --, therefor.

In Column 12, Line 61, delete "coupled," and insert -- coupled --, therefor.

In Column 13, Line 10, delete "with mini-slot" and insert -- with a mini-slot --, therefor.

CERTIFICATE OF CORRECTION (continued)
U.S. Pat. No. 10,735,240 B2

In Column 13, Line 33, delete "transmitting module 1452." and insert -- receiving module 1454. --, therefor.

In Column 14, Line 3, delete "DFI" and insert -- DFT --, therefor.

In Column 14, Line 66, delete "TFR" and insert -- a TFR --, therefor.

In Column 15, Line 1, delete "TFR" and insert -- a TFR --, therefor.

In Column 15, Line 4, delete "one more" and insert -- one or more --, therefor.

In Column 15, Line 5, delete "TRF" and insert -- TFR --, therefor.

In Column 15, Line 20, delete "one more" and insert -- one or more --, therefor.

In Column 15, Line 25, delete "any embodiments" and insert -- any of embodiments --, therefor.

In Column 15, Line 33, delete "in wireless" and insert -- in a wireless --, therefor.

In Column 15, Line 41, delete "TRFs" and insert -- TFRs --, therefor.

In Column 15, Line 46, delete "one more" and insert -- one or more --, therefor.

In Column 15, Line 62, delete "one more" and insert -- one or more --, therefor.

In Column 16, Line 7, delete "non limiting" and insert -- non-limiting --, therefor.

In Column 16, Line 16, delete "could so be" and insert -- could also be --, therefor.

In Column 16, Line 27, delete "UE(s) in which" and insert -- UE(s) which --, therefor.

In Column 16, Line 29, delete "using PDCCH." and insert -- using a PDCCH. --, therefor.

In Column 16, Line 34, delete "DC may" and insert -- DCI may --, therefor.

In Column 16, Line 51, delete "explicitly" and insert -- explicit --, therefor.

In Column 16, Line 67, delete "indication" and insert -- indication. --, therefor.

In Column 17, Line 21, delete "Indicated." and insert -- indicated. --, therefor.

Figure 11:
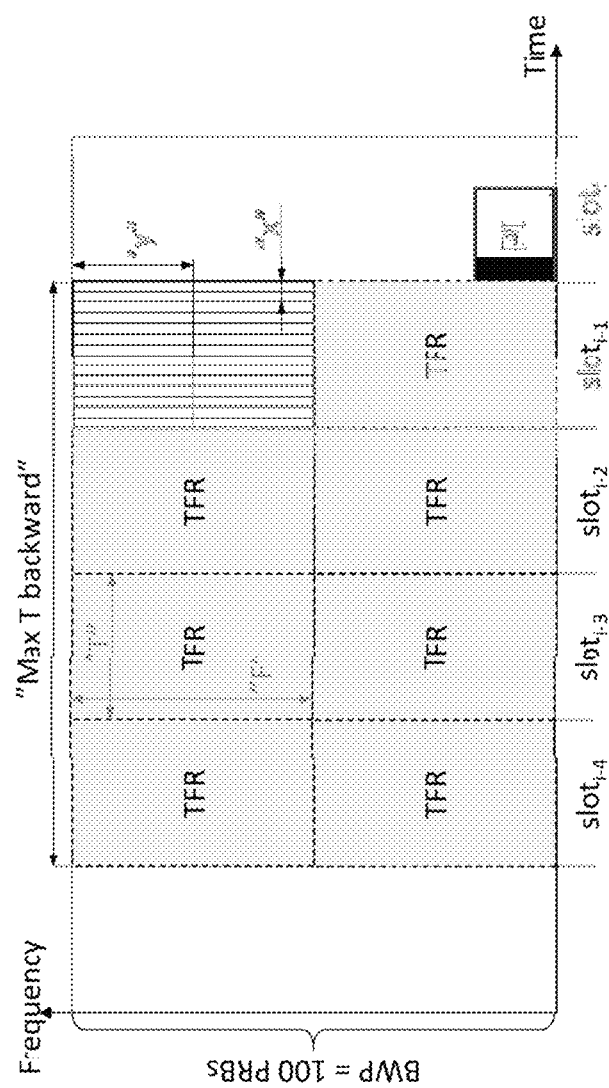
FIG. 11 illustrates an example of t-f-grid logical structure in pre-emption indication algorithm.

In Column 17, Line 34, delete "FIG. A1," and insert -- FIG. 11, --, therefor.

In Column 17, Lines 49-50, delete "messages for to" and insert -- messages to --, therefor.

In Column 18, Line 4, delete "BBC" and insert -- RRC --, therefor.

CERTIFICATE OF CORRECTION (continued)
U.S. Pat. No. 10,735,240 B2

In Column 18, Line 8, delete ""T."" and insert -- "T;" --, therefor.

In Column 18, Line 19, delete "size, interpretation" and insert -- size. Interpretation --, therefor.

In Column 18, Line 20, delete "and, general" and insert -- and general --, therefor.

Figure 12:
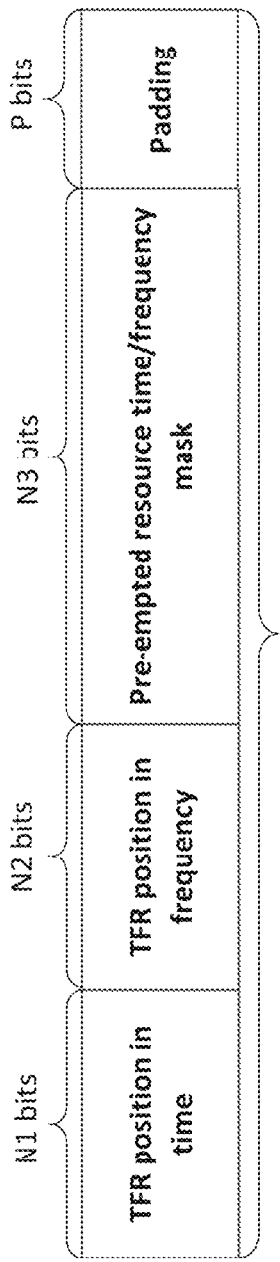
FIG. 12 illstrates a premption indication message structure.
Figure 13:
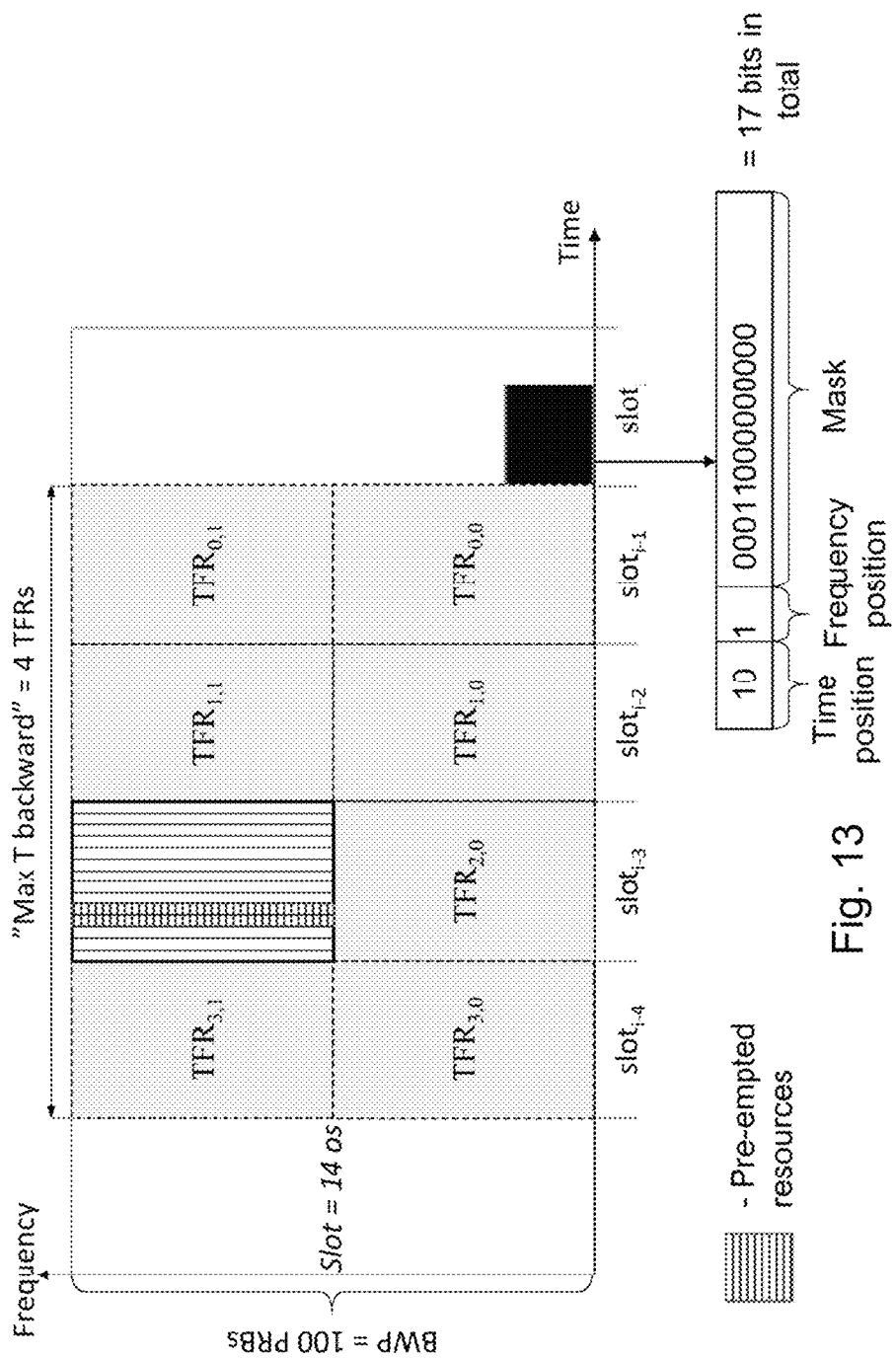
FIG. 13 illustrates preemption indication example 1-1.
Figure 14:
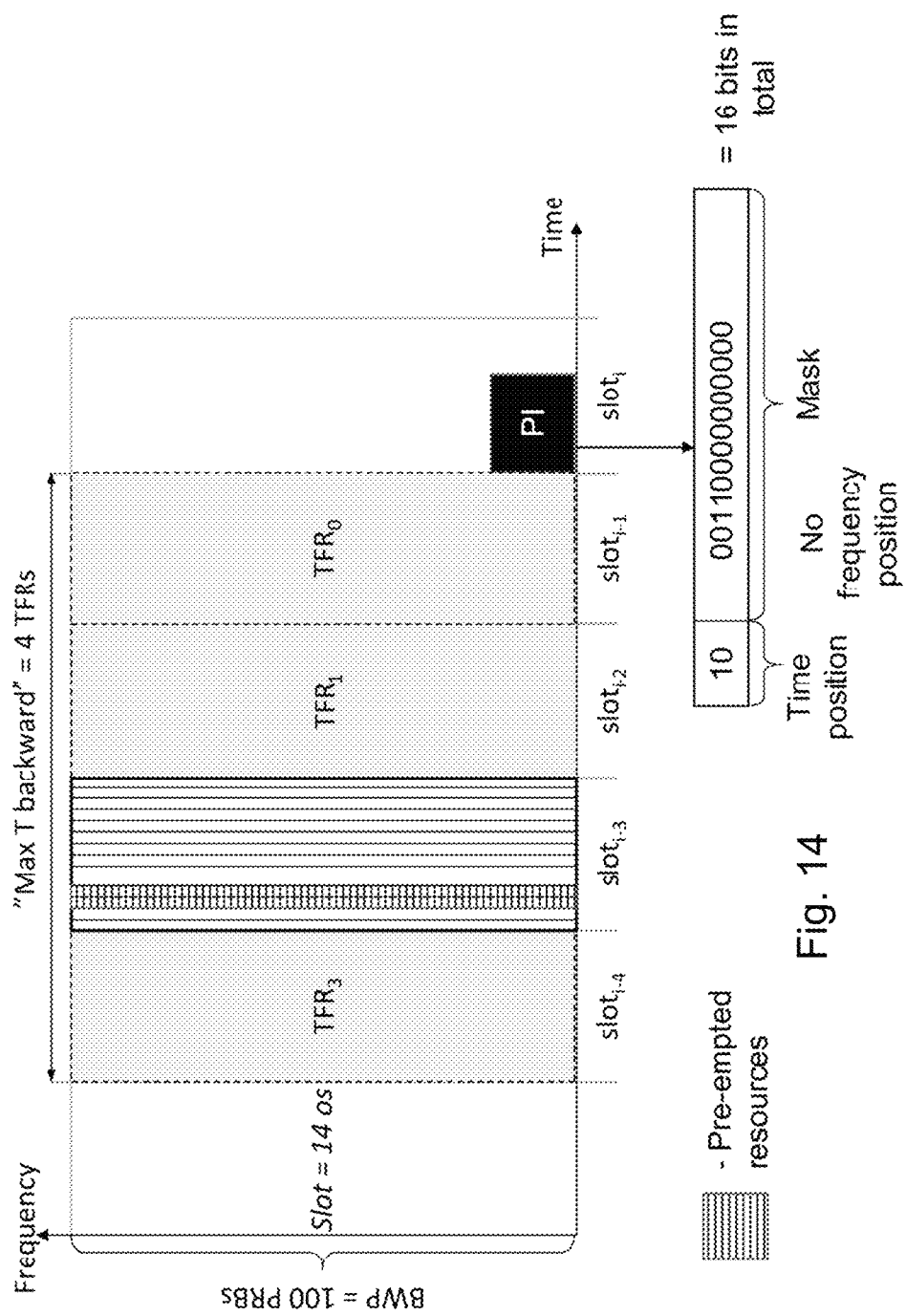
FIG. 14 illustrates preemption indication example 1-2.

In Column 18, Line 21, delete "FIG. A2." and insert -- FIG. 12. --, therefor.

In the Claims

In Column 19, Line 19, in Claim 1, delete "one more" and insert -- one or more --, therefor.

In Column 19, Line 47, in Claim 4, delete "one more" and insert -- one or more --, therefor.

In Column 20, Line 18, in Claim 5, delete "one more" and insert -- one or more --, therefor.

In Column 20, Line 46, in Claim 8, delete "one more" and insert -- one or more --, therefor.